United States Patent [19]

Jansson et al.

[11] Patent Number: 5,153,926
[45] Date of Patent: Oct. 6, 1992

[54] PARALLEL PROCESSING NETWORK THAT CORRECTS FOR LIGHT SCATTERING IN IMAGE SCANNERS

[75] Inventors: Peter A. Jansson, Hockessin; John H. Fralinger, Bear, both of Del.

[73] Assignee: E. I. Du Pont de Nemours and Company, Wilmington, Del.

[21] Appl. No.: 446,493

[22] Filed: Dec. 5, 1989

[51] Int. Cl.$^5$ .............................................. G06K 9/36
[52] U.S. Cl. ......................................... 382/54; 382/6; 356/337; 378/87
[58] Field of Search ...................... 382/68, 54, 1, 6; 356/343, 337; 378/7, 86, 87

[56] References Cited

U.S. PATENT DOCUMENTS

| | | | |
|---|---|---|---|
| 4,180,741 | 12/1979 | Palmatier et al. | 250/559 |
| 4,187,435 | 2/1980 | Palmatier et al. | 250/559 |
| 4,210,818 | 7/1980 | Green et al. | 250/559 |
| 4,384,336 | 5/1983 | Frankle et al. | 382/49 |
| 4,484,232 | 11/1984 | Gast | 358/299 |
| 4,493,106 | 1/1985 | Farhangi et al. | 382/41 |
| 4,534,059 | 8/1985 | Yamada | 382/54 |
| 4,586,089 | 4/1986 | Nakazato et al. | 358/280 |
| 4,636,845 | 1/1987 | Alkofer | 358/80 |
| 4,646,252 | 2/1987 | Terashita | 364/525 |
| 4,649,422 | 3/1987 | Rauskolb et al. | 358/76 |
| 4,653,080 | 3/1987 | Kikuchi et al. | 378/7 |
| 4,653,926 | 3/1987 | Fukui | 356/444 |
| 4,670,793 | 6/1987 | Yamada et al. | 358/284 |
| 4,677,681 | 6/1987 | Klausz | 382/6 |
| 4,688,242 | 8/1987 | Ema | 378/154 |
| 4,689,691 | 8/1987 | Isogai et al. | 358/280 |
| 4,691,240 | 9/1987 | Kurusu et al. | 358/282 |
| 4,727,562 | 2/1988 | Belanger | 378/99 |
| 4,748,513 | 5/1988 | Yamada | 358/280 |

OTHER PUBLICATIONS

Shaw et al., "A Technique of Scatter and Glare Correction for Videodensitometric Studies in Digital Videoangiography", *Radiation Physics*, vol. 142, No. 1, Jan. 1982, pp. 209–213.

Richard A. Tuft, "Intelligent Image Digitizing Subsystems", *Electronic Imaging*, Mar. 1983.

Peter A. Jansson, "Method for Determining the Response Function of a High-Resolution Infrared Spectrometer", *Journal of the Optical Society of America*, vol. 60, No. 2, pp. 184–191, Feb. 1970.

Jansson et al., "Implementation and Application of a Method to Quantitate 2-D Gel Electrophoresis Patterns", *Electrophoresis*, vol. 4, pp. 82–91, 1983.

Peter A. Jansson, "Deconvolution with Applications in Spectroscopy", 1984, pp. 3–4, 58–61, 138–139, 1984.

*Primary Examiner*—Leo H. Boudreau
*Assistant Examiner*—Andrew W. Johns

[57] ABSTRACT

A signal representative of the total incident flux on each area element of a target plane is generated. Each area element corresponds to a portion of the object from which the flux emanates. Each total incident flux signal is corrected to eliminate therefrom the effects of flux incident on the corresponding area element due to scattering, thereby to generate a signal representative of the flux incident on that area element emanating only from the portion of the object corresponding to that area element. The total incident flux signal is corrected by weighting each total incident flux signal in accordance with a predetermined weighting factor $W(x,y)$, and summing the weighted signal representative of the total flux incident on an area element with a weighted total incident flux signal from each of the other area elements.

48 Claims, 8 Drawing Sheets

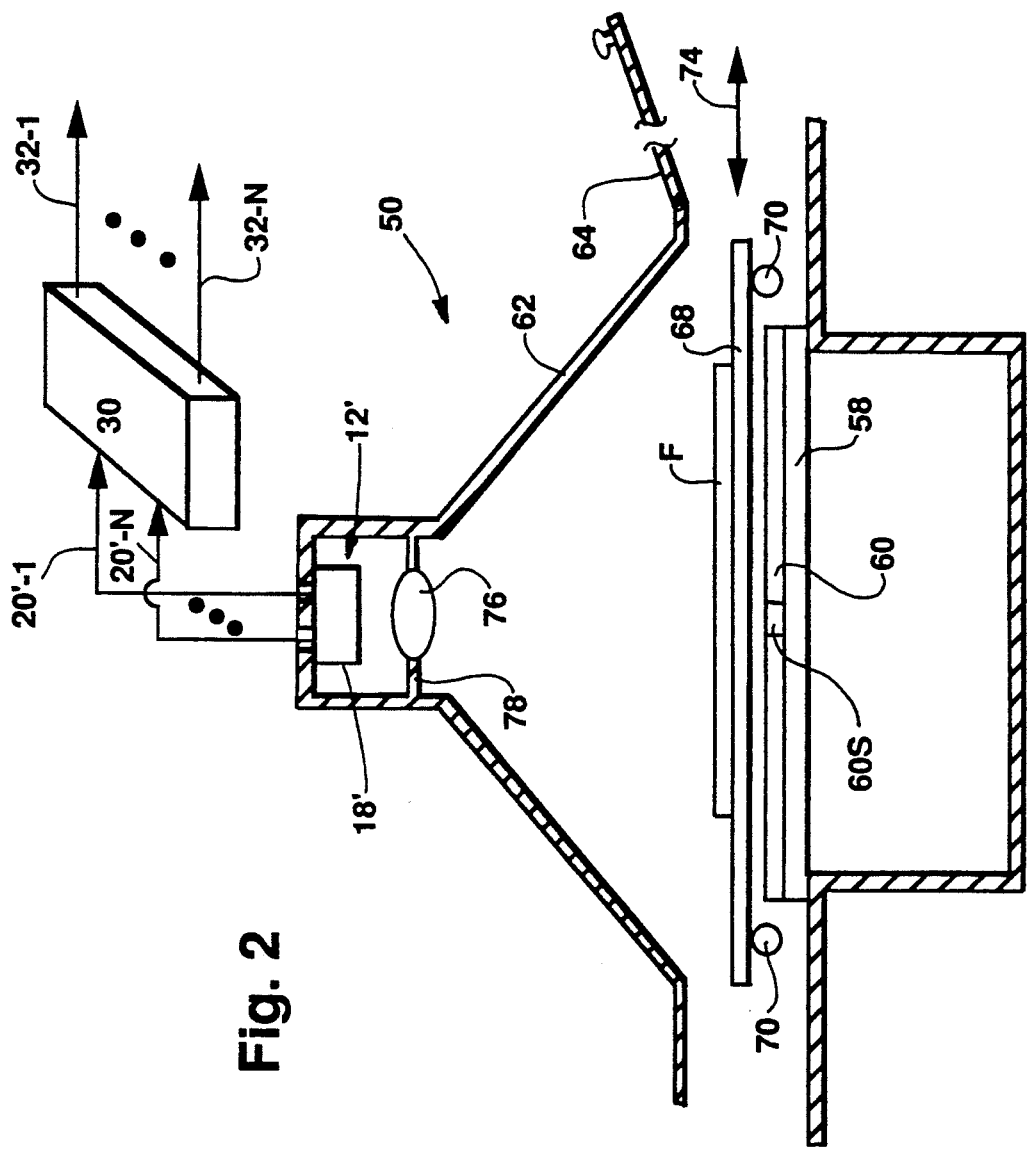

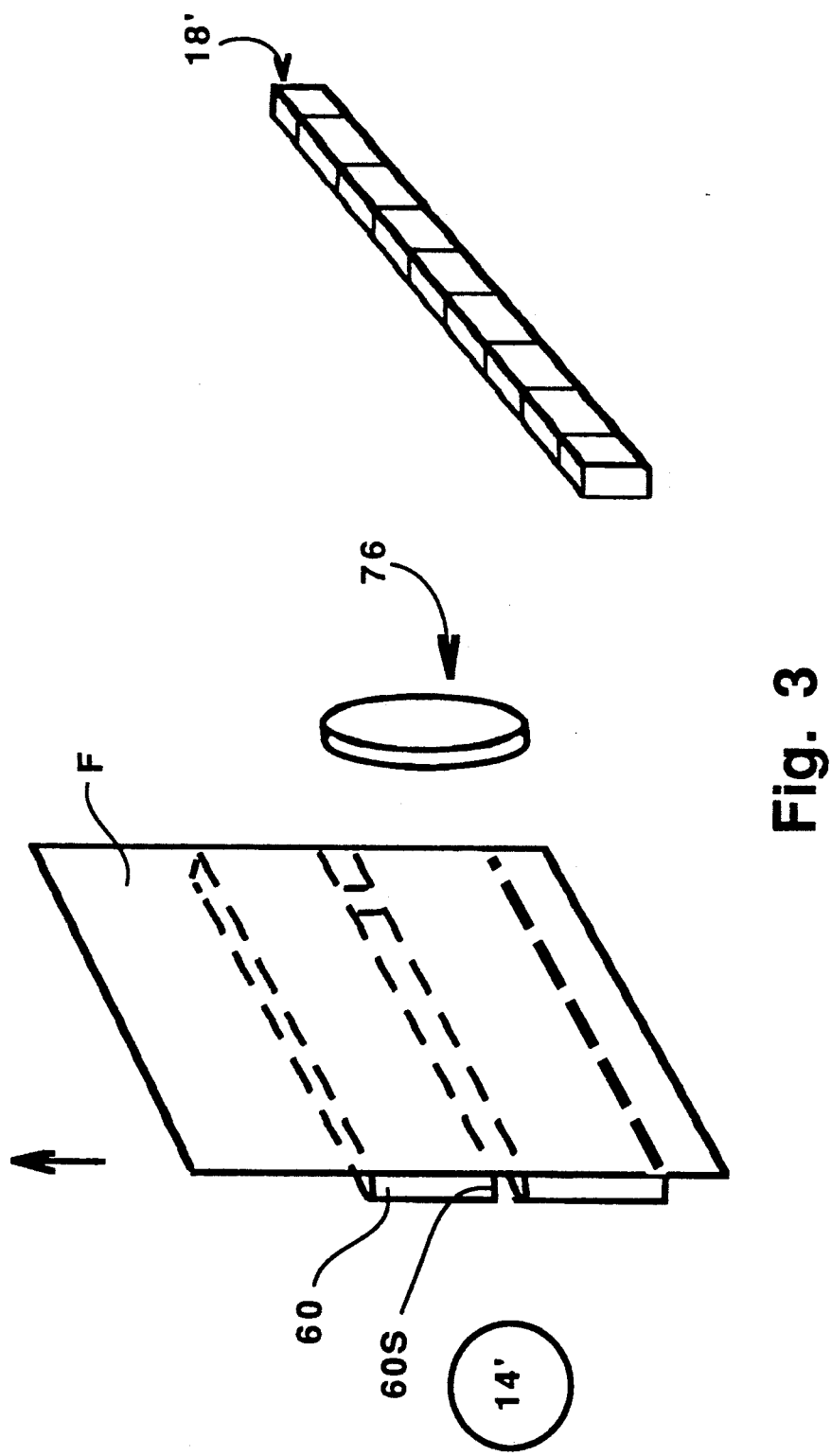

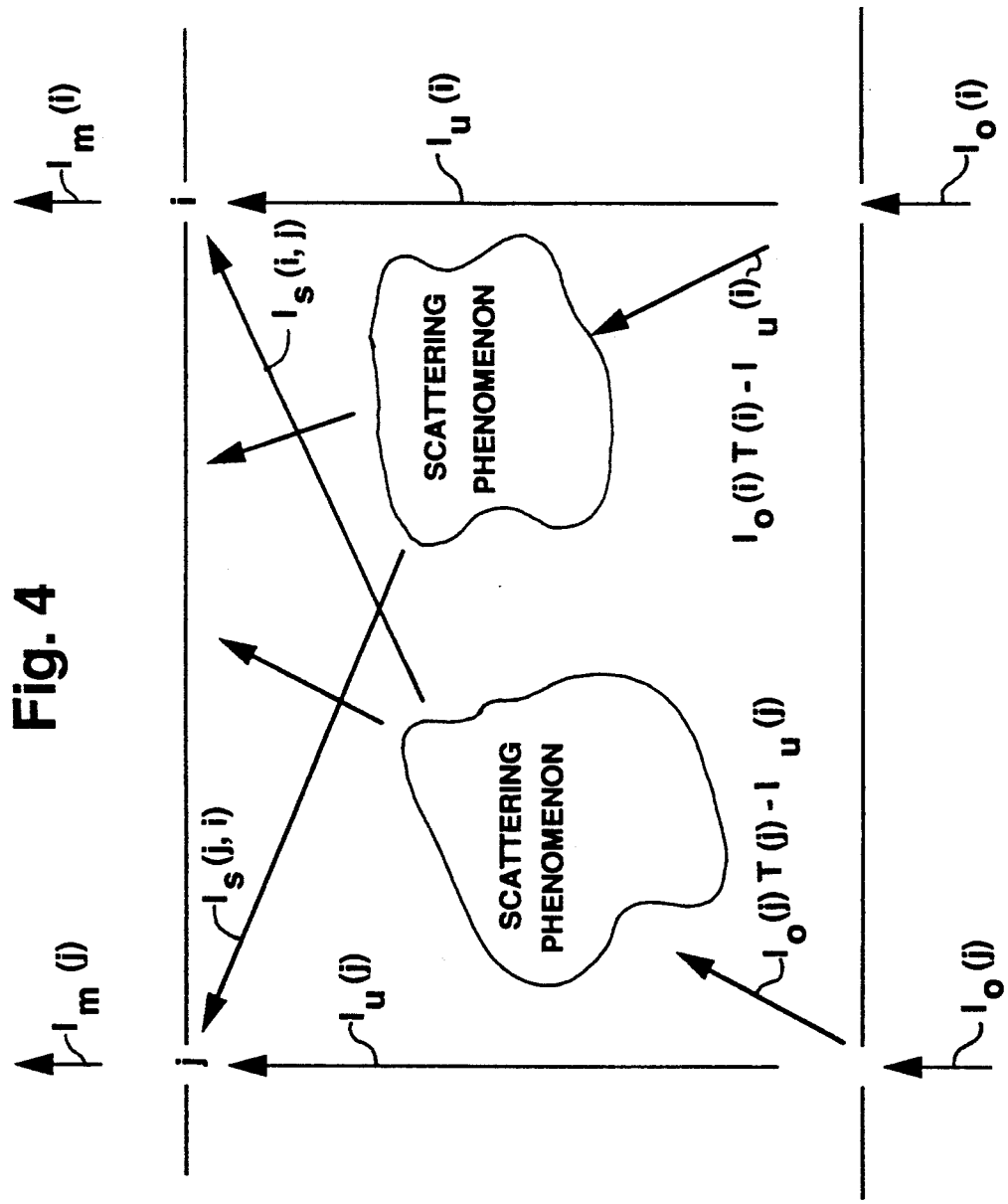

METHOD STEPS

1. INTRODUCE TRANSPARENCY HAVING KNOWN TRANSMITTANCE INTO APPARATUS

2. MEASURE FLUXES IN DETECTOR PLANE RESULTING FROM KNOWN TRANSPARENCY

3. DETERMINE RESPONSE MATRIX AND DERIVED QUANTITIES

4. INTRODUCE TRANSPARENCY HAVING UNKNOWN TRANSMITTANCE INTO APPARATUS

5. MEASURE FLUXES IN DETECTOR PLANE RESULTING FROM UNKNOWN TRANSPARENCY

6. OBTAIN TRUE TRANSMITTANCES OF UNKNOWN TRANSPARENCY

Fig. 5

PARALLEL PROCESSING NETWORK THAT CORRECTS FOR LIGHT SCATTERING IN IMAGE SCANNERS

BACKGROUND OF THE INVENTION

1. Field of the Invention

The present invention relates to an imaging apparatus, and in particular, to an imaging apparatus that corrects for the effects of flux scattering.

2. Description of the Prior Art

One of the useful properties of photographic film is that it records incident radiant flux in a manner that compresses dynamic range. It has become standard practice to measure the response of photographic film to a given exposure by determining the optical density of the resulting transparency. This is accomplished by illuminating the transparency and measuring the light flux that is transmitted or reflected. Precise measurement of transmitted or reflected flux values when reading transparencies is hampered by technical equipment limitations such as failure to create even illumination in the plane of the transparency, vignetting, optical misalignment, and sensor nonuniformity. Some prior art devices have attempted to correct for these limitations, such as the device disclosed in Jansson et al., "Implementation and application of a method to quantitate 2-D gel electrophoresis patterns", *Electrophoresis* 4, 82–91 (1983).

The measurement of transmitted or reflected flux values may also be hampered by other factors such as scattering of flux due to dust on the optical elements, scattering of flux due to imperfections in the optical system, and scattering of flux from the transparency itself.

Various attempts have been made to use optical isolation to eliminate or reduce the contribution of scattered flux due to these above-listed scattering phenomena while measuring the flux transmitted through a transparency. An instrument known as a digital scanning microdensitometer is used to scan an entire image on a transparency, pixel by pixel, to convert it to a series of numbers or to a digitized image. This form of the data is useful for subsequent image processing and analysis. Scanning can be accomplished by planar motion of a stage containing the transparency, or alternately, rotation of a drum having the transparency thereon. Such a device, however, requires troublesome mechanical parts that demand a high level of precision, limit the speed of the scan, render the scanner cost high, and produce wear that limits the life of the equipment. As a result, the cost of such a device is excessive.

Methods and apparatus that correct for resolution distortion in spectrometers and other optical devices are summarized in Jansson, "Deconvolution: With Applications in Spectroscopy", Academic Press (1984).

In view of the foregoing it is believed advantageous to obtain the speed and convenience of a relatively low cost scanner, yet at the same time obtain the precision and accuracy that attends the use of isolation to eliminate the effects of scattered flux.

SUMMARY OF THE INVENTION

The present invention relates to an apparatus and method for imaging an object having flux emanating therefrom, the object having a predetermined number of discrete portions thereon. In accordance with the present invention, a target plane having a plurality of area elements is defined. Each area element corresponds to a portion of the object. A signal representative of the total incident flux on each area element is generated. Each total incident flux signal is corrected to eliminate therefrom the effects of flux incident on the corresponding predetermined area element due to scattering, thereby to generate a signal representative of the flux incident on that area element emanating only from the portion of the object corresponding to that area element.

The total incident flux signal is corrected by weighting each total incident flux signal in accordance with a predetermined weighting factor $W(x,y)$, and summing the weighted signal representative of the total flux incident on an area element with a weighted total incident flux signal from each of the other area elements. Each weighting factor $W(x,y)$ is functionally related to a predetermined response matrix R formed of a predetermined number of response coefficients $R(x,y)$. A response coefficient $R(x,y)$ represents a quantification of the degree to which a given one of the area elements, (for example, the x-th area element) is affected by flux emanating from a portion of the object corresponding to another area element, (e.g., the portion corresponding to the y-th area element) that is, due to scattering, incident on the x-th area element. Each response coefficient $R(x,y)$ represents a property of the imaging apparatus that is not dependent upon an object being observed or upon a test object used to calibrate the apparatus.

BRIEF DESCRIPTION OF THE DRAWINGS

The invention will be more fully understood from the following detailed description, taken in connection with the accompanying drawings, which form a part of this application and in which:

FIG. 2 is a stylized schematic representation of a densitometer that embodies the teachings of the present invention for determining the optical density of a transparency;

FIG. 3 is a highly stylized schematic perspective representation of the optical path of the densitometer shown in FIG. 2;

FIG. 4 is a highly stylized schematic representation showing the disposition of flux falling upon a single pixel i and upon a single neighboring sample pixel j in the densitometer;

FIG. 5 is a block diagram showing the steps of a general method of determining the true transmittances of a transparency having previously unknown transmittances;

DETAILED DESCRIPTION OF THE INVENTION

Figure 1A:
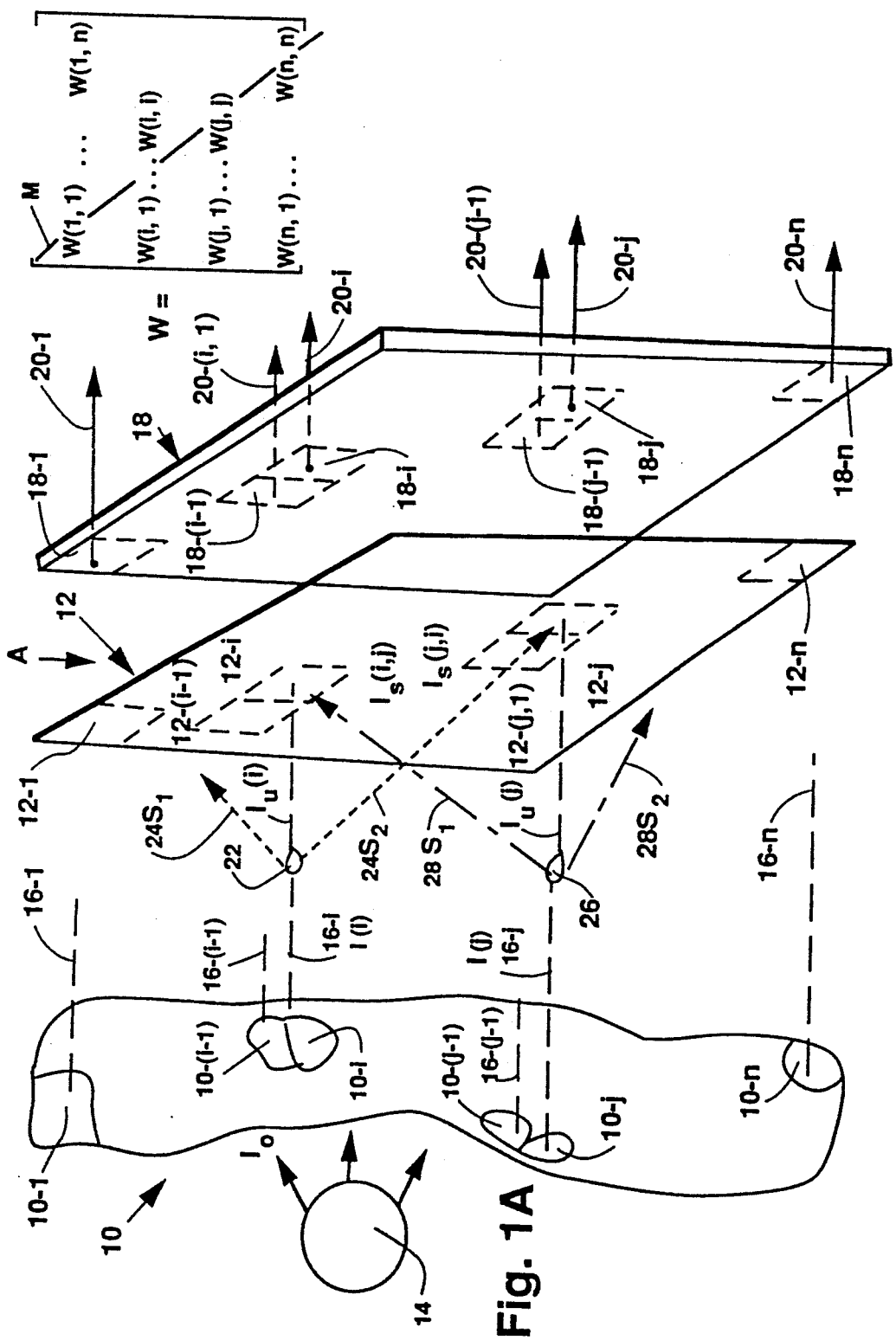
FIGS. 1A and 1B together form a highly stylized pictorial representation of a generalized imaging system embodying the general principle underlying the present invention whereby the effects of scattering are accommodated.

Throughout the following detailed description similar reference numerals refer to similar elements in all Figures of the drawings.

Although the more detailed mathematical basis for the present invention is derived in connection with a more particularized embodiment set forth hereinafter, the general nature of the problem to which the present invention addresses itself may be understood from the highly stylized representation of a generalized imaging apparatus indicated by the reference character A in accordance with the present invention shown in FIGS. 1A and 1B. An arbitrary object 10 is shown as being disposed in generally confrontational relationship with respect to a target plane 12 forming part of the apparatus A. Although not illustrated it should be understood that suitable optical components may be interposed between the object 10 and the target plane 12. The entirety of the object 10 that confronts the target plane 12 may be understood to be subdivisible into a predetermined number N of discrete portions, several of which, viz., the portions 10-1, 10-(i-1), 10-i, 10-(j-1), 10-j, and 10-N are illustrated by way of example. To insure that only those portions of the object that confront the target plane contribute flux it may be necessary or desireable in some instances to block certain potential flux paths surrounding the object by masks, stops, baffles or similar structures.

In response either to irradiation from incident radiation $I_0$ from a source 14 appropriately positioned with respect to the object 10 or because of its self-luminousity, radiant flux emanates from the discrete portions of the object 10. It should be apparent by implication from the foregoing that, for purposes of this application, the object 10 may be understood to be either a self-emissive object, a reflective object, or a transparent object. The flux emanating from the object 10 impinges on the target plane 12. The target plane 12 contains a predetermined number N of area elements. Again, several of the area elements 12-1, 12-(i-1), 12-i, 12-(j-1), 12-j and 12-N, respectively corresponding to the portions 10-1, 10-(i-1), 10-i, 10-(j-1), 10-j, and 10-N of the object 10, are shown. In FIG. 1A the respective flux paths 16 from only two portions 10-i and 10-j of the object 10 are illustrated by the bold dashed lines, referenced by respective reference characters 16-i and 16-j, with the flux paths from the other portions of the object being suggested. The magnitude of the radiant flux from each respective portion is indicated by the characters $I(i)$ and $I(j)$.

In the typical case, as will be more fully developed hereafter, a photodetector arrangement generally indicated at 18 is associated with the target plane 12. The photodetector arrangement 18 forms part of the apparatus A. The photodetector arrangement 18 may be positioned in any convenient operative location with respect to the target plane 12. In FIG. 1A the photodetector 18 is shown as lying generally behind the target plane 12. It should also be understood that in various implementations of the present invention suitable optical components may also be interposed at any appropriate positions between the target plane 12 and the photodetector arrangement 18. The term "photodetector" should be understood to encompass detectors of energy flux other than electromagnetic.

In the general case, portions of the photodetector arrangement 18 are associated with corresponding area elements of the target plane 12. For example, the portions 18-1, 18-(i-1), 18-i, 18-(j-1), 18-j and 18-N of the photodetector arrangement 18 are respectively associated with the area elements 12-1, 12-(i-1), 12-i, 12-(j-1), 12-j and 12-N of the target plane 12. The total number N of discrete portions into which the object 10 is subdivided is generally determined by the number of area elements defined on the target plane 12 and by the number of corresponding associated portions of the photodetector arrangement 18. It lies within the contemplation of the invention that multiple detectors may be configured to behave as one detector entity.

At this point it should be noted that in many implementations of the invention the target plane 12 and the photodetector arrangement 18 may be physically integrated. For example, the target plane 12 may be defined on the surface of a planar photodiode array, on the surface of a light sensitive photographic film, or on the surface of a vidicon target. In these instances it is apparent that the target plane is inherent in the structure of the photodetector arrangement.

In other instances the target plane and the photodetector arrangement may be physically separated from each other. For example, in the case of a laser scanner, the focussing and timed positioning of an interrogating laser beam is used to illuminate portions of the object in some predetermined pattern. The movement of the beam is typically generated using a rotatable mirror. Light reflected by (or transmitted through) the portion of the object being illuminated at any given instant of time is collected by a suitable light collector arrangement. In such an arrangement the surface of the collector at that instant defines the area element of the target plane corresponding to that illuminated portion of the object. The associated photodetector arrangement is usually positioned at a location that does not lie in the target plane.

It should therefore be understood that the depiction in FIG. 1A of separate and distinct area elements of the target plane 12 as corresponding to separate and distinct portions of the photodetector arrangement 18 should not be construed to limit or exclude any apparatus, such as a laser scanner, in which area elements of the target plane 12 are identified only by their temporal sequence in a timed scan. Although in such case the target plane may, in the physical sense, have just one area element, it should be appreciated from the foregoing that at any given instant of time that target plane corresponds to the portion of the object being illuminated. Thus, the timed scan of the beam across the object produces a succession of such correspondences and, hence, a succession of area elements corresponding to various portions of the object. It is in this sense that, in the case of the laser scanner, the target plane may be said to exhibit a plurality of area elements, each of which corresponds to a portion of an object.

However the apparatus is configured, each portion of the photodetector arrangement 18 is operative to provide a signal that represents the total radiant flux impinging on the area element of the target plane 12 corresponding to that portion of the photodetector arrangement 18. In FIGS. 1A and 1B each such signal is carried on an output line 20 associated with each of the detectors in the photodetector arrangement. It should be understood that the signals on the output lines 20 may be multiplexed over a single line. Those skilled in the art will understand that corrections to the signal on the line 20 output from a given photodetector may be necessary to remove nonlinear response of the photodetector to flux and to compensate for offset that introduces an additive constant to the output of the photdetector.

In the absence of scattering, radiant fluxes I(i) and I(j) emanating from the respective portions 10-i and 10-j of the object 10 along the respective flux paths 16-i and 16-j would impinge directly upon corresponding area elements 12-i and 12-j of the target plane 12. Those direct flux paths from the portions of the object 10 to the corresponding area elements of the target plane 12 are indicated in FIG. 1A by the collinear bold and fine dashed lines. Absent scattering or absorption the flux emanating from a given portion of the object 10 and impinging upon the corresponding portion of the target plane 12 would not be attenuated.

However, in a non-idealized and practically realizable apparatus, scattering occurs. In the flux path 16-i, for example, a scattering volume, illustrated diagrammatically at 22, will cause a part of the flux I(i) to be scattered along one or more alternative flux paths. A scattering volume should be understood to potentially contain surfaces that specularly reflect flux in either forward and/or backward directions. For flux I(i) along the path 16-i two alternative flux paths $24S_1$ and $24S_2$ are shown as dotted lines. Similarly, in the case of the flux I(j) propagating along the path 16-j a scattering volume 26 would result in two alternative flux paths $28S_1$ and $28S_2$, which are shown as dot-dash lines. Some of the flux scattered by the volume 22, for example, the flux along the path $24S_2$, would be directed toward and impinge upon the area element 12-j. This flux is indicated in FIG. 1A by the reference character $I_S$ (j,i). Similarly, some of the flux scattered by the volume 26, for example, the flux along the path $28S_1$, would be directed toward and impinge upon the area element 12-i. This flux is indicated in FIG. 1A by the reference character $I_S$ (i,j). Some part of the flux emanating from each portion of the object 10 would, however, impinge on the area element corresponding thereto. This flux is indicated in FIG. 1A by the reference characters $I_U$ (i) and $I_U$ (j). It should be understood that $I_U$ (i) and $I_U$ (j) may be attenuated by absorption losses in the respective flux paths.

From FIG. 1A it may thus be seen that the total incident flux impinging on a given area element of the target plane 12 (and falling upon the photodetector arrangement 18 to produce the signal on the line 20 therefrom) is equal to the flux emanating directly from the portion of the object 10 corresponding to the given portion in the target plane 12 plus the sum of the flux emanating from other portions of the object and scattered onto that given portion of the target plane. Symbolically, for the area element 12-i, the following equation holds:

$$I_M(i) = I_U(i) + \sum_{\substack{j=1 \\ j \neq i}}^{N} I_S(i, j), i = 1, \ldots N \quad (1)$$

where $I_M(i)$ is the total incident flux impinging on a given area element of the target plane 12 as measured by the photodetector arrangement 18 associated therewith, $I_U(i)$ is the flux emanating directly from a portion of the object 10 corresponding to the given portion in the target plane 12 that is incident on that portion of the target plane, and $I_S(i, j)$ is the flux emanating from other portions of the object 10 and scattered onto the given portion of the target plane 12.

Similar relationships may be written to define the total measured incident flux for each of the other area elements on the target plane 12.

From the relationship given in Equation (1) it may be seen that the radiant flux emanating from a predetermined portion of the object 10 and incident on the corresponding area element of the target plane 12 may be represented (for the area element 12-i)

$$I_U(i) = I_M(i) - \sum_{\substack{j=1 \\ j \neq i}}^{N} I_S(i, j). \quad (2)$$

In accordance with this invention, the apparatus A includes means generally indicated at 30 (FIG. 1B) is provided for correcting a signal representative of the total radiant flux incident on a given area element to eliminate from that signal the effects of flux incident on the corresponding area element due to scattering. The correcting means 30 is associated with the photodetector arrangement 18 and is operative to correct the signals on the lines 20 to generate a signal on each one of an array of output lines 32 that represents the radiant flux incident on a given area element on the target plane 12 emanating only from the portion of the object 10 corresponding to that area element. The correcting means 30 may be implemented in a hardwired form comprised of discrete components, in an integrated circuit and/or hybrid circuit form, or by an appropriately programmed digital computer.

The correcting means 30 includes an array of summing elements 34-1 to 34-N. Each summing element 34 corresponds to one of the area elements 12. As is seen in FIG. 1B each summing element 34 is connected to each of the output lines 20 from the detectors 18 by an array of lines 22. Each summing element 34 has associated therewith an array of N weighting elements 36-1 through 36-N. Each one of the array of weighting elements 36 associated with a given summing element 34 is connected respectively in each one of the lines 22 that link that given summing element to the lines 20 from the detectors 18.

Each weighting element applies a predetermined weighting factor W(x,y) to the signal on the line 22 in which it is connected. Each weighting factor W(x,y) is, in turn, functionally related to a predetermined response matrix R formed of a predetermined number of response coefficients R(x,y). The functional relationship between the response matrix R and the weighting factor W(x,y) may be indicated by the notation $W(x,y)=f_{x,y}(R)$. A response coefficient R(x,y) represents a quantification of the degree to which a given one of the area elements, (for example, the x-th area element) is affected by flux emanating a portion of the object corresponding to another area element, (e.g., the portion corresponding to the y-th area element) that is, due to scattering, incident on the x-th area element. Each response coefficient R(x,y) is determined in a manner to be described using a predetermined test object. Each response coefficient R(x,y) is a ratio representing a property of the imaging apparatus that is not dependent upon the object being observed or the test object used to calibrate the apparatus.

From the response coefficient $R(x,y)$ the value of each of the weighting factors $W(x,y)$ is calculated in accordance with any of various methods, all to be described. As will be seen the methods differ in their degree of precision and in their applicability to the varying scattering characteristics that may be present in different apparatus. Thus, the weighting factor $W(x,y)$ for the weighting elements will vary, in accordance with the method utilized to calculate the same.

Deriving the weighting factors from the response coefficients, which in turn are ratios representative of apparatus properties, will insure that the appropriate correction is applied to each signal even though the intensities of the fluxes encountered during actual use of the apparatus differ from the flux intensities used to calibrate the apparatus and produce the response coefficients.

The signals on all of the lines 22, each weighted by the appropriate weighting factor, are applied either additively or subtractively to each of the summing elements 34. The cooperative association of the summing elements 34 and the weighting elements 36 forms a parallel processing network (implemented in any manner as set forth above) that is operative to produce on each signal line 32 a signal that is representative of the total incident radiant flux on each area element of the target plane 12, corrected for the effects of scattering.

METHOD OF PRODUCING THE RESPONSE COEFFICIENTS

To produce the response coefficients $R(x,y)$, the apparatus A is calibrated using a test object. A preferred test object includes a plurality of flux sources, the number of flux sources corresponding to the number of detectors in the photodetector arrangement 18. Preferably, the test object is selected to generally cover the entire field that confronts or would confront an imaging apparatus in accordance with the present invention when the apparatus is in use. The flux sources are illuminated singly, in some predetermined order, and the response signal on each line 20 from each detector 18 is monitored. Following such a procedure, a table may be produced. The table may conveniently take a matrix form. The matrix contains the response of each detector 18 to an individual flux source.

The response coefficients are functionally related to the response signals. In accordance with the preferred technique for producing the response coefficients, the values of the detector responses for a given active flux source are divided by a quantity representative of the true flux emanating from the given active flux source. These quotients, one for each detector and all related to a single flux source, appear in a single column of a response coefficient matrix. Repeating this procedure for each other sequentially activated flux source yields the other columns of the response coefficient matrix.

The quantity representative of the true flux emanating from the given active flux source may be established in any convenient manner. For example, the quantity representative of the true flux emanating from the given active flux source may be defined to be proportional to the sum of the values of the detector responses for a given active flux source. Alternatively, the quantity representative of the true flux emanating from the given active flux source may be determined by measuring the actual flux output from the source, assuming that such a measurement can be conveniently made. Other alternative methods for defining the quantity representative of the true flux emanating from the given active flux source may also be used.

It should be appreciated that other forms of test object may be found useful or the response coefficients may be calculated based upon the design of the apparatus. However formulated (whether empirically or from first principles) a matrix of response coefficients representing the properties of the apparatus is generated.

THE WEIGHTING FACTORS

As noted earlier, each of the weighting factors $W(x,y)$ is functionally related to at least its corresponding response coefficient $R(x,y)$. Each of the weighting factors $W(x,y)$ may also be functionally related to some others of the response coefficients. Depending upon the degree of precision required and the nature of scattering in a given apparatus different formulations may be specified to calculate the weighting factors $W(x,y)$ to be employed in the correcting means 30. The weighting factors are also preferably expressed in matrix form, with the dimension of the weighting factor matrix corresponding to the dimension of the response coefficient matrix. The weighting factor matrix is shown in FIG. 1A. The weighting factor matrix W is an $N \times N$ square matrix that includes a main diagonal indicated in FIG. 1A by the reference character M. All of the other diagonals of the weighting factor matrix extend parallel to and in the same direction as the main diagonal M.

In accordance with a first method, each weighting factor $W(x,y)$ is directly proportional to at least its corresponding response coefficient $R(x,y)$, although, as noted, it may be functionally related to others of the response coefficients.

In accordance with a second method, assuming that the appropriate timing, switching and storing elements are provided, an even more precise approximation may be achieved.

Figure 1B:
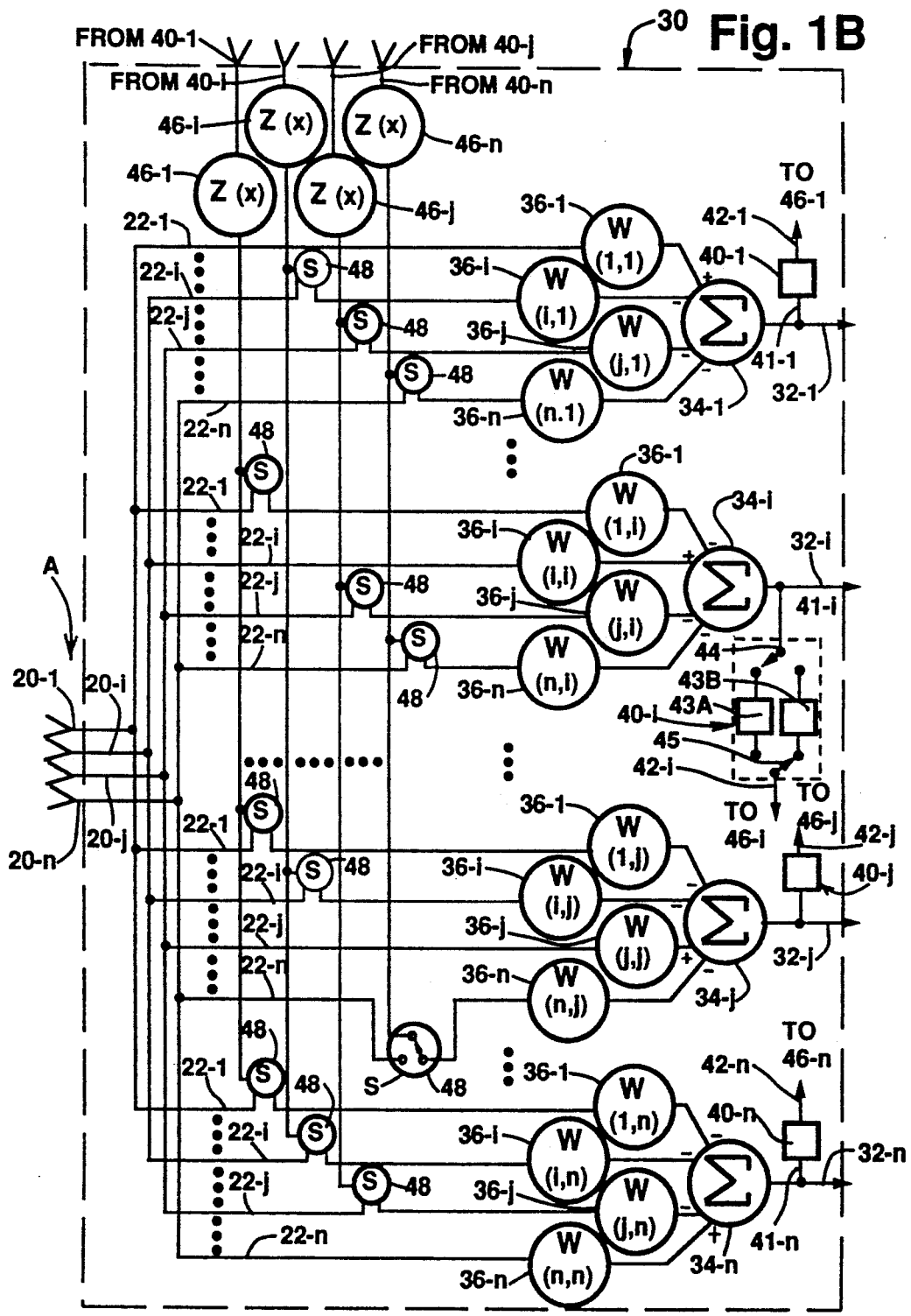

To implement the second method, as is seen in FIG. 1B, the correction means 30 includes a plurality of storage arrangements 40-1 to 40-N. Each storage arrangement 40 is respectively connected to one of the summing elements 34 by a line 41. The output of each storage arrangement 40 is carried over a line 42. Each storage arrangement 40 may be implemented in any convenient fashion, with only the storage arrangement 40-i being illustrated in detail, it being understood that all of the other storage arrangements being functionally identical to it. As seen in FIG. 1B, each storage arrangement 40 includes a first and a second storing element 43A, 43B that are alternatively connectible between the line 41 and the line 42 by a respective input switch 44 and an output switch 45. The switches 44 and 45 are connected in opposition to each other so that at any given time one of the storing elements is connected to the line 41 and the other of the storing elements is connected to the line 42. Each storage arrangement 40 may thus be seen to define storing means connected to the output of each of the summing elements for storing the signal therefrom. It is, of course, understood, that the storing means may be implemented in any of a variety of ways, so long as the storing function performed thereby allows the correcting means to provide, in temporal succession, increasing more accurate corrections that reduce the effects of scattered flux on the total radiant flux signal, until sufficient accuracy is obtained.

In accordance with the second method the correction means 30 further includes a set of feedback weighting elements 46-1 to 46-N. The output line 42 from each storage arrangement 40 is connected to one of the feedback weighting elements 42. Each feedback weighting element 46 is operative to weight a signal on the output line 42 of its associated storage arrangement 40 by a predetermined feedback weighting factor $Z(x)$. In the preferred instance each feedback weighting factor $Z(x)$ is proportional to a corresponding response coefficient $R(x,x)$.

The correcting means 30 is further modified in accordance with the second method to further include a set of switches 48 associated with each of the summing elements 34. Each set of switches 48 contains $(N-1)$ switching elements. Each of the switch elements 48 associated with a given one of the summing elements 34 is connected in the appropriate line 22 intermediate the feedback weighting element 46 associated with that summing element and one of the weighting elements 36 associated with that summing element. The switches 48 are connected in a manner such that each of the lines 22 associated with a summing element 34 has a switch 48 therein, except there is no switch 48 provided in the subscripted line 22 corresponding to the subscript of the summing element. For example, in the case of the summing element 34-$i$, there is a switch 48 connected in each of the lines 22 associated with the summing element 34-$i$, with the exception that there is no switch 48 connected in the line 22-$i$, that is the line having the corresponding subscript. Thus, a given summing element remains connected to the total flux signal generating means to which it corresponds through the weighting element 36. The switch elements 48 are operative to disconnect a given weighting element from all of the other total flux signal generating means with which it is associated and to connect that weighting element to a predetermined one of the feedback weighting elements. Each switch 48 may be implemented in any convenient fashion, with only one of the switches 48 being illustrated in detail, it being understood that all of the other switches 48 are functionally identical to it.

In operation, when the correcting means 30 is initialized the lines 22 are not opened by the switches 48 and the first storing element 43A is connected to the output of the summing element 34. The first order corrected flux signals thus appear at the output of the summing elements 34 and are tracked and stored by the first storing element 43A in the storage arrangement 40 associated with that summing element 34. The switches 48 are asserted to disconnect selected ones of the weighting elements 34 from the total flux signal generating means 18 with which they are associated and to connect each of those weighting elements to a predetermined one of the feedback weighting elements 46. Once asserted a switch 48 remains in this position throughout subsequent steps of this method. Simultaneously with the opening of the lines 22 by the switches 48, the switches 44 and 45 are asserted to permit the stored first order flux signals (stored by the storage element 43A) to be applied to the weighting elements 46 while the outputs of the summing elements 34 are simultaneously applied to the second storing elements 43B. The outputs of the summing elements 34 yield the second order corrected flux signals, which are tracked and stored by the second storing elements 43B. A reversal of the positions of the switches 44 and 45 applies the stored second order flux signals (stored in the second storage element 43B) to the feedback weighting elements 46. The outputs of the summing elements 34 then yield the third order corrected flux signals. In this fashion the connections of the storing elements are cycled by repeated operation of the switches 44 and 45 until the outputs of the summing elements 34 provide a sufficiently accurate representation of the radiant flux incident on a given area element in the target plane 12 emanating only from the portion of the object 10 corresponding to that area element.

As with the implementation of all of the methods described in this application, the switching, timing and storing and feedback elements may be implemented by an appropriately programmed digital computer.

In accordance with a third method, in addition to each element in the matrix of weighting factors being functionally related to the corresponding response coefficient, the values of the weighting factors along the main diagonal M of the weighting factor matrix are equal, and the values along each of the other parallel diagonals are also equal, so that each diagonal contains a sequence of identical values that might (or might not) be equal to the values in one of the other diagonals. Another way of visualizing it is that all rows are right-shifted replicas of the first row, each successive row one step to the right, with the exception that new values must be added at the left to fill the space made available as the rows are shifted to the right. Values on the right disappear as the shifting pushes them beyond the places available. A matrix such as this is said to be "Toeplitz". A Toeplitz weight matrix might be most useful to correct for flux scattering in an apparatus in which the amount of flux scattered from each portion of the object to a given target plane area element depends on the distance and direction from the given target plane element to the target plane element corresponding to the portion of the object.

In accordance with a fourth method, the value of a given element on the main diagonal M of the weighting factor matrix is equal to or substantially equal to a first value, and, in addition, the values of all the other elements in the column of the weighting factor matrix containing that element are equal or substantially equal to a second value. Each of the columns may be different from all of the others having unique first and second values. The matrix is thus not Toeplitz.

Finally in a fifth method, the weighting factor matrix is again Toeplitz, with the values of the elements on the main diagonal being equal or substantially equal to a first value. In addition, the values of all of the other elements in all of the columns of the weighting factor matrix are equal or substantially equal to a second value.

In accordance with a sixth method, weighting factors are the values of a matrix that is the inverse of the response coefficient matrix. This may be cumbersome to implement, or inverting the response matrix may involve numerical difficulties. Sometimes, when numerical difficulties arise, pseudoinverse techniques may be employed. Pseudoinverse techniques are disclosed in Abbott, "Regression and the Moore-Penrose Pseudoinverse", Academic Press, New York (1972).

-o-0-o-

The present invention is believed to find particular utility when implemented in the environment of a densitometer apparatus generally indicated by reference character 50 in the stylized schematic representation of FIG. 2. The densitometer 50 generally corresponds to the apparatus A of FIG. 1. It is the function of this densitometer apparatus 50 to measure the optical density at a plurality of specifically localized areas or pixel locations of a transparency F that is inserted into the apparatus 50.

The densitometer 50 includes a light box 52 in which is disposed a light source 14', analogous to the source 14 in FIG. 1. The box 52 is vented and cooled as appropriate. The upper surface of the light box 52 is defined by a transparent diffuser plate 58. Disposed over the plate 58 is a mask 60 having a slit 60S therein, provided for a purpose to be made clearer herein.

A light-tight enclosing shroud 62 is mounted to the light box 52. Access to the interior of the shroud 62 is afforded through a suitable door 64. A support member for the transparency, for example, in the form of a transparent glass platen 68, is mounted on suitable rollers 70 within the shroud 62. The platen 68 defines the support surface on which the transparency F, corresponding to the object 10 in FIG. 1, may be mounted. The platen 68 is mounted for reciprocal rectilinear movement in the directions indicated by the arrows 74. A suitable roller drive arrangement is, of course, provided to effect relative movement between the transparency F on the platen 68 and the mask 60. It should be understood that the term support member as used herein is meant to encompass any other arrangement for supporting the transparency, including a rotating drum with a window or a frame-like member supporting the transparency only at its edges.

A lens 76 is supported on a suitable lens bracket 78 that is secured in any convenient fashion in the upper portion of the shroud 62. Disposed a predetermined focal distance above the lens 76 is an array of detectors 18' that extend in a linear fashion normal to the plane of FIG. 2. It should be apparent that the array of detectors 18' corresponds to the photodetector arrangement 18 in FIG. 1A. It should also be readily apparent from the foregoing that the receptor surface 12' of the detectors 18' in the array corresponds to the target surface 12 of FIG. 1A. Throughout the remainder of the discussion the area elements of the target plane 12 and the photodetectors 18 associated with those area elements may be viewed as merged into the detectors 18'. The output lines 20' from the detectors 18' are connected to the correcting means 30, which may be physically housed in the shroud 62 or in any other convenient location. It should be understood that the signals on the output lines 20' may be multiplexed over a single line such that at a given instant of time the single line may correspond to one of the lines depicted as 20'.

As may be understood from FIGS. 2 and 3, as relative motion occurs between the platen 68 with the transparency F thereon with respect to the slit 60S in the mask 60 an entire scan line of the transparency F is exposed to illumination from the source 14' and is imaged by the lens 76 onto the linear array of photodetectors 18'. The exposed line of the transparency may be subdivided into a predetermined number of pixels 1 to N, which corresponds to the number of the detectors 18'.

FIG. 4 is a highly stylized schematic drawing showing the disposition of flux falling upon a single pixel i and upon a single neighboring sample pixel j in the densitometer shown in connection with FIGS. 2 and 3.

Density at the i-th pixel location of the transparency is defined as $$D(i) = \log_{10}[I_0(i)/I(i)] \qquad (3)$$

where $I_0(i)$ is the flux incident on the film at position i and $I(i)$ is the flux transmitted at that position. The transparency transmittance, $T(i)$, at location i is given by $$T(i) = I(i)/I_0(i). \qquad (4)$$

Thus the density $D(i)$ may be expressed as $$D(i) = \log_{10}[1/T(i)]. \qquad (5)$$

In the subsequent description, the determination of transmittance $T(i)$ is detailed. The conversion of these measurements to density $D(i)$ is readily understood as being accomplished via Equation (5).

As can be seen from FIG. 4, the disposition of a spatially varying flux $I_0(i)$ incident upon the i-th pixel in the exposed line of the transparency F causes this pixel i to transmit flux $$I(i) = T(i)I_0(i). \qquad (6)$$

Some of the transmitted flux, the unscattered flux $I_U(i)$, is passed directly to the detector at detector location i. The remainder of the transmitted flux, $$I(i) - I_U(i) = I_0(i)T(i) - I_U(i), \qquad (7)$$

is scattered to other locations within the densitometer. Some of it ultimately falls upon other detectors.

That portion which falls upon detector element j may be defined as $I_S(j, i)$. FIG. 4 also shows the disposition of flux $I_0(j)$ falling on a neighboring pixel location j of the transparency.

The flux scattered from pixel location j in the transparency F to corresponding pixel location i in the detector plane can be expressed as a product:

$$I_S(i, j) = S(i, j)T(j)I_0(j), \text{ for } j \neq i. \qquad (8)$$

Here the quantity $S(i, j)$ is the ratio of the flux that emanated from the sample at location j that ultimately falls upon detector location i, to the flux transmitted at sample location j. For i varying from 1 to N define the quantity $$S'(i,i) = I_U(i)/[T(i)I_0(i)] \qquad (9)$$

and, for both i and j varying from 1 to N, $i \neq j$, define $$S'(i, j) = S(i, j) \qquad (10)$$

so that the total flux incident upon the detector element i is $$I_M(i) = I_U(i) + \sum_{\substack{j=1 \\ j \neq i}}^{N} S(i, j)T(j)I_0(j) \qquad (11)$$
$$= \sum_{j=1}^{N} S'(i, j)T(j)I_0(j).$$

The quantity $S'(i, i)$ is the ratio of the unscattered flux transmitted at sample location i to the total flux transmitted at sample location i.

The spatial variation of the incident flux may be incorporated with $S'(i, j)$ into a new quantity $$R(i, j) = S'(i, j)I_0(j) \tag{12}$$

so that Equation (11) becomes $$I_M(i) = \sum_{j=1}^{N} R(i, j)T(j). \tag{13}$$

Equation (13) may be expressed as a matrix equation $$I_M = RT, \tag{14}$$

in which $I_M$ is a column vector whose elements are the measured fluxes $I_M(i)$, R is the scanner response matrix whose elements are the $R(i, j)$ defined above, and T is a column vector whose elements are the sample transmittances $T(i)$.

-o-0-o-

The method of estimating the true sample transmittances of a transparency is now described.

It is the principal function of the densitometer apparatus in accordance with the teachings of the present invention to determine the true transmittances, hence the true densities, of a transparency. Generally speaking, transparencies having known and carefully specified transmittances are first introduced into the densitometer. Resulting fluxes are measured by the detectors 18'. From the known transmittances and measured fluxes the densitometer response matrix and its inverse, or other quantities needed for subsequent calculations, are determined. A transparency having unknown transmittances is then introduced into the densitometer. The resulting fluxes are measured. Quantities derived from the response matrix are then applied to the measurements of the unknown transparency to obtain estimates of the true transparency transmittances. The general method is summarized in FIG. 5.

All of the methods to be described for use in conjunction with the densitometer apparatus contain an implicit or explicit correction for errors introduced by the detection of scattered flux. The corrections are described in the context of the response matrix R. This matrix compactly summarizes the optical characteristics of the densitometer essential to this description. It expresses in a manner appropriate to the description of a densitometer the scattering characteristics that are more generally described by the scattering matrices $S(i, j)$ and $S'(i, j)$. Following a brief statement of the general principle, and of the techniques used to determine R, six methods will be detailed that provide estimates of the values $T(i)$, which may in turn be used to obtain estimates of $D(i)$, the true sample densities, via Equation (5).

In order to determine the response matrix R, a calibration transparency that transmits light from only one pixel at location j is introduced into the densitometer. Resulting fluxes are measured at all locations along the line of the scan. From Equation (13) we see that matrix elements $R(i, j)$ are determined by $$R(i, j) = I_C(i)/T_C(j), \tag{15}$$

where $I_C(i)$ is the value of measured flux $I_M(i)$ with the calibration transparency in place, and $T_C(j)$ is the transmittance $T(j)$ of the calibration transparency. In order to determine all of the values of the matrix R, a succession of calibration transparencies must be introduced, each transmitting flux at just one pixel location j, the succession of calibration transparencies covering all possible locations j.

COMPUTATION OF WEIGHTING FACTOR MATRIX

In the first method of this invention, after determination of the values of matrix R, a sample transparency having unknown transmittances is introduced into the densitometer. Resulting fluxes $I_M$ are measured. Useful approximations to the true transmittances $T(i)$ are obtained in one step via the equation:

$$T(i) = [1/R(i, i)][I_M(i)] - [1/R(i, i)]\sum_{\substack{j=1 \\ j \neq i}}^{N} R(i, j)I_M(j)/R(j, j). \tag{16}$$

The transmittances are thus obtained from the measurements in one step by a process that involves a single matrix product.

Figure 6:
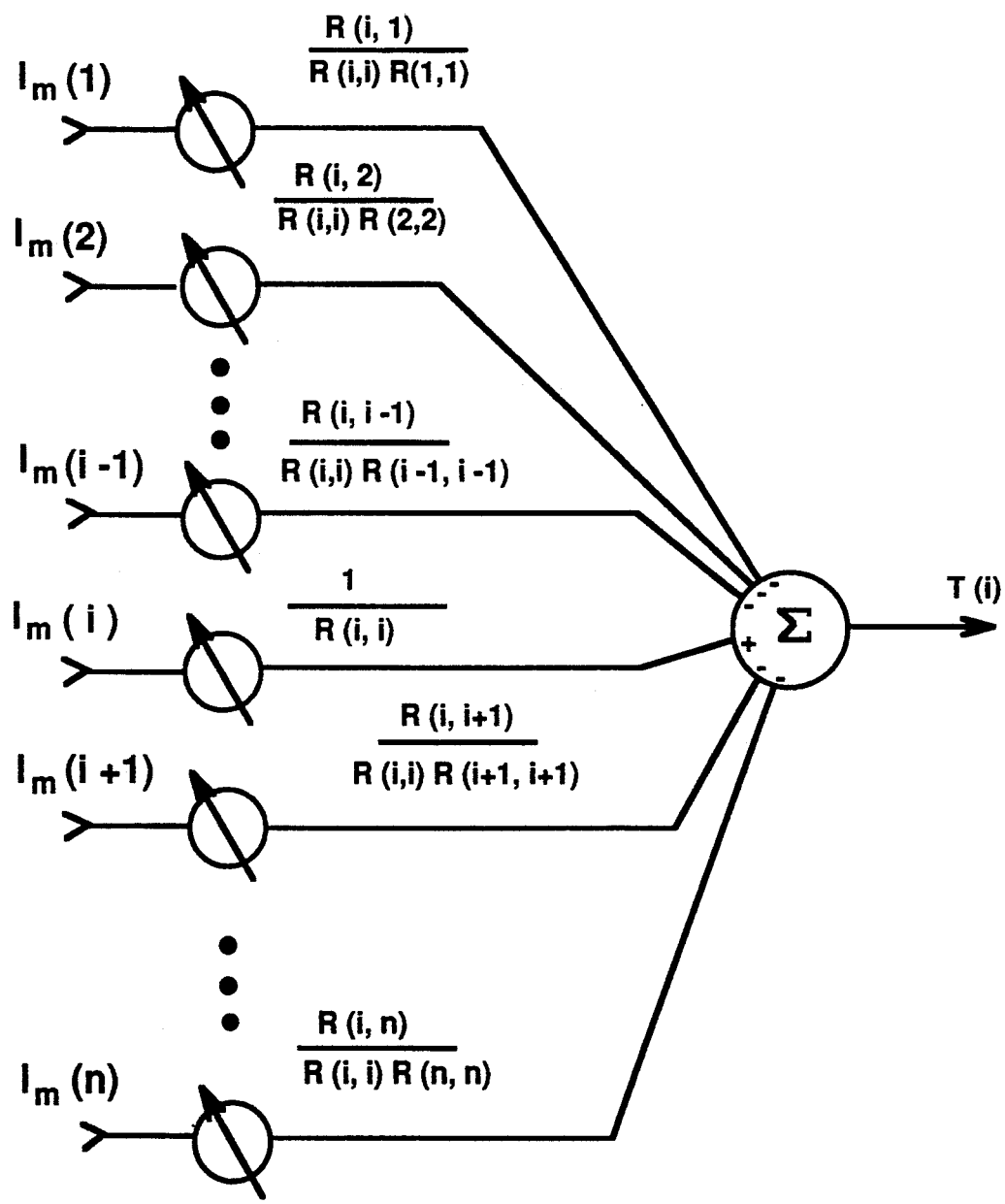
FIG. 6 is a schematic diagram showing a parallel processing network used to determine the true sample transmittance at a single pixel location i by forming a weighted sum of the detector signals originating from neighboring pixels.
Figure 7:
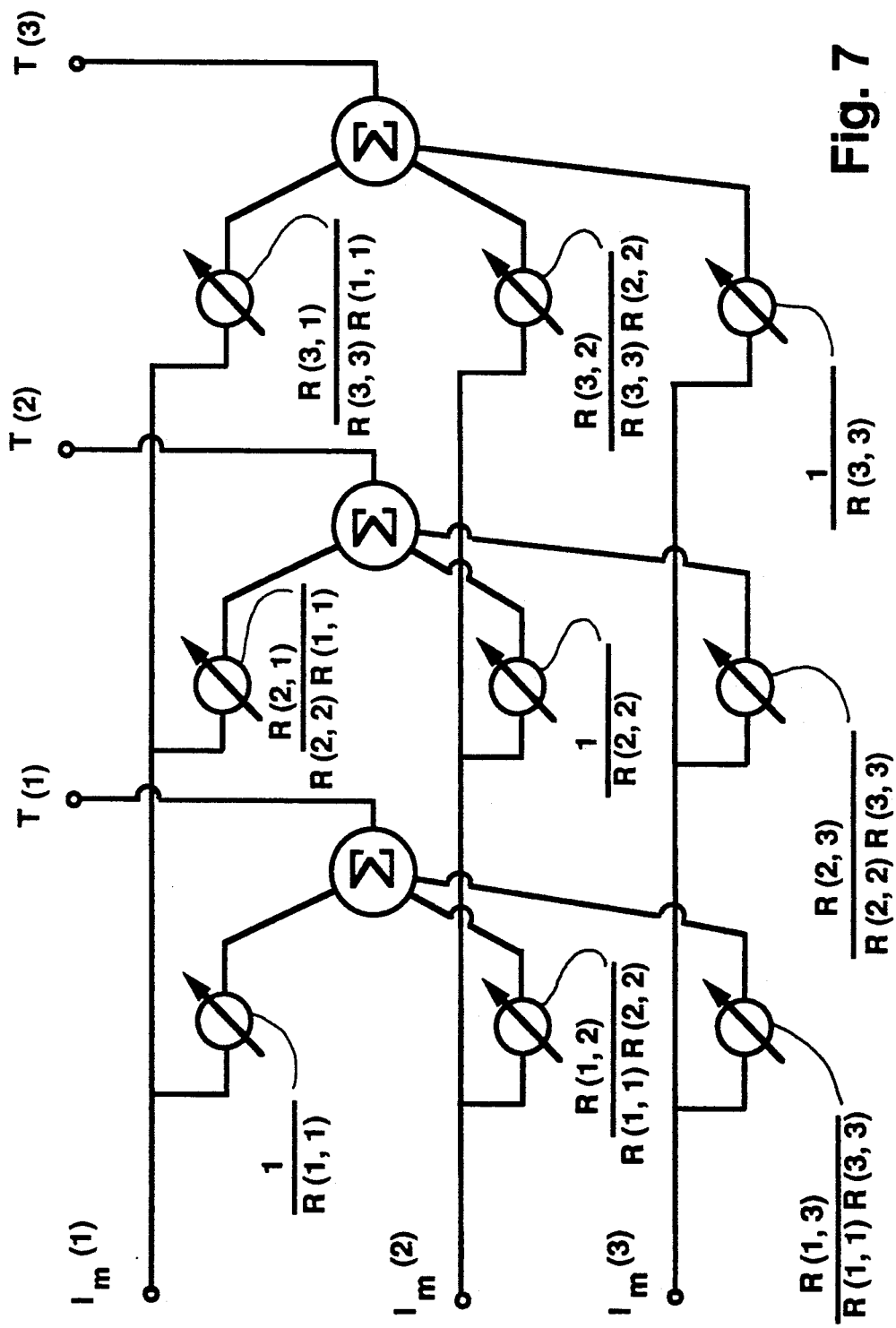
FIG. 7 is a schematic diagram showing a parallel processing network used to determine the true sample transmittance at all three pixel locations of a three detector element scanner.

The process may be implemented in a parallel processing network, shown generally in FIG. 1B, and a portion of which is again shown in detail in FIG. 6. In this figure the weighted sum and the weighting factors W required to correct a single pixel i are explicitly shown as quotients of various R values in the response matrix. All the weighted sums and the entire set of weighting factors needed to correct for scattered light in a very small three-detector-element densitometer are shown in FIG. 7. Although probably too limited for practical usefulness, it is included here since its simplicity lends itself to a complete illustration of the various values of the weighting factors W in the correcting means 30.

Of course, the process may also be implemented in serial fashion in a digital computer or other type of signal processor. The general idea of determining and storing response matrix values, and subsequently employing them to correct for scattering is captured in the flow diagram of FIG. 5. This one-step method is simple, fast, and convenient, yet performs with good accuracy. It represents a good compromise between accuracy and complexity. The one-step method is therefore the preferred method.

If, however, additional accuracy is required, a second method may be employed that requires repeated application of Equation (16) of the first method. In the second method, the values of R and $I_M(i)$ are determined as in the first method. As in the first method, Equation (16) is applied. In this second method, however, the first resulting values $T(i)$ are considered to be merely first approximations to the true transparency transmittances. They are used to form the products $R(j, j)T(j)$ and substituted for the $I_M(j)$ in the quantity governed by the summation sign of Equation (16). Thus, $I_M(j)$ is replaced by a value that is proportional to the result $T(j)$ of a previous application of the expression for $T(i)$. (The $I_M(i)$ in the left-hand term is not replaced.) Applied again in this fashion, Equation (16) now yields a new set of $T(i)$, a second approximation to the true transmittances. The weighting factors employed in the weighted sum are exactly the same ones as those employed in the first method described above. This iterative process is repeated until the differences between successive sets of $T(i)$ are negligibly small.

In the third method of this invention, the one-step method with shift-invarient scattering, we have noted that for some scanners the matrix R(i, j) may be Toeplitz or approximately Toeplitz. That is, all rows are shifted replicas of the first row so that Equation (16) may be expressed in a form containing a partial discrete convolution.

In order to implement the third method, the matrix R and the fluxes $I_M(i)$ are first determined as in the first and second methods. A useful approximation to the true transmittances is then obtain by applying $$T(i) = [1/R(O)] \left[ I_M(i) - \sum_{\substack{j=1 \\ j \neq i}}^{N} R(i-j) I_M(j)/R(O) \right] \quad (17)$$

In this equation we have defined a new singly subscripted variable $R(p) = R(q, r)$, where $p = q - r$. This definition is made possible by the Toeplitz nature of R. Since all the rows of R are similar in this case, any row may be used to obtain the values of the R(i). If the rows are only approximately identical, or if they are uncertain due to noise, average values of the R(i) may be used which may be computed from the shifted values of the R(i) obtained from all the rows. This method has an advantage over the previous two methods in that a full matrix of values for R need not be stored. Furthermore, the partial convolution in Equation (17) may be computed with the aid of electronic transversal filters or tapped delay lines.

The fourth method of this invention, the non-shifting response method, makes use of the observation that some scanners detect the same amount of scattered flux, or approximately the same amount, at each pixel along the detector, and that this flux is a weighted sum of the illuminating flux and sample transmittances along the scan line in the sample plane. In this case, all the rows of the scattering matrix S are identical.

In order to implement the fourth method of this invention, the matrix R and the fluxes $I_M(i)$ are first determined as in the first three methods. New quantities $R'(j)$ are then computed from the matrix R via $$R'(O) = 1/N \sum_{j=1}^{N} R(j, j) \quad (18)$$

and $$R'(j) = [1/(N-1)] \sum_{i=1}^{N} R(i, j), j = 1, \ldots, N. \quad (19)$$

A useful approximation to the true transmittance is then obtained by applying $$T(i) = I_M(i)/R'(O) - [1/R'(O)] \left[ \sum_{\substack{j=1 \\ j \neq i}}^{N} R'(j) I_M(j)/R'(O) \right] . \quad (20)$$

For each sample scan having a new set of transmittances T(i), the right-hand term above is the same for all pixels i. This method is therefore easier to apply because it only involves subtracting a constant value from all the measurements $I_M(i)/R'(O)$. The constant needs to be redetermined for each scan line, however.

In the fifth method of this invention, the product-free method, we note that the product $R'(j)I_M(j)$ in the fourth method requires computation that would be desirable to avoid. Accordingly, it is possible to make the approximation that the $I_M(j)$ need not be weighted in computing the sum. That is, all the weights in the weighted sum are one.

In order to implement the fifth method of this invention, the quantities $R'(j)$ and the fluxes $I_M(i)$ are obtained as in the fourth method. A constant a is then computed:

$$a = [1/R'(O)]^2 [1/N] \sum_{j=1}^{N} R'(j). \quad (21)$$

Useful approximations to the true transmittances are then obtained by applying $$T(i) = I_M(i)/R'(O) - a \sum_{j=1}^{N} I_M(j). \quad (22)$$

The constant a is seen to be independent of measurements $I_M(i)$ and therefore does not need to be re-determined for each scan line.

Note also that Equation (14) may be solved for unknown T by finding the inverse of matrix R:

$$T = R^{-1} I_M. \quad (23)$$

This equation suggests a sixth method. It shows that it is possible to determine the true sample transmittances T(i), hence the true densities D(i), from the measured fluxes $I_M(i)$, provided that the densitometer response matrix is known. Numerical methods such as Gaussian elimination may be used to compute $R^{-1}$. Such a computation may be effected, for example, using a digital computer operating in accordance with any suitable commercially available program for computing an inverse of matrix, such as available from IMSL, Houston, Tex. As noted previously, inverting the response matrix may involve numerical difficulties and, in such instances a seventh method, employing pseudo-inverse techniques, as referenced previously herein, may be used.

-o-0-o-

Computing the quantities to be subtracted in the above methods may involve excessive time and circuit complexity. Because the response matrix R varies slowly with position and because the correction term may be small, it is not always necessary to compute every element of the summations required. Sparse sampling techniques can thus be employed. More specifically, the contribution of each and every element does not need to be included. Samples might be either evenly spaced or random. It could be useful to sample most densely where the contributions are the largest. It is even possible to make weights implicit in the sample spacing. In such a method, the samples are simply added together, yet the sum computed is actually the required weighted sum. Interpolation methods are also useful with sparse sampling.

-o-0-o-

While a densitometer has been hereinbefore disclosed as the principal application of the apparatus A (and method) in accordance with the present invention, it will be understood by anyone skilled in the art that the present invention applies equally as well to a light microscope and other light imaging systems such as a camera or a telescope where the object or sample is remote from the apparatus containing the invention or to imaging systems that employ fluxes of particles such as the electron microscope and scanning electron microscope. In the case of a light camera or a telescope, a calibration setup would be employed to determine the values of a matrix characteristic of the scattering. Such a setup would employ single point-like sources of light flux in a manner analogous to the use of samples having known transmittance. The electron microscope would likewise require use of special samples of known electron transmission or scattering properties in order to determine the values of the scattering matrix.

Those skilled in the art, having the benefit of the teachings of the present invention as hereinbefore set forth, will appreciate numerous modifications which may be imparted thereto. It should be understood that such modifications are to be construed as lying within the contemplation of the present invention, as defined by the appended claims.

What is claimed is:

1. Apparatus for imaging an object having a predetermined number of discrete portions thereon, the object having flux emanating therefrom, the apparatus comprising:
   a target plane having a plurality of area elements, each area element corresponding to a portion of the object;
   means for generating a signal representative of the total incident flux on each predetermined area element, each total incident flux signal being weighted, the weighting being determined by the response of each incident flux signal generating means to a single test flux source positioned at a predetermined position with respect to the target plane; and
   means for correcting each total incident flux signal to eliminate therefrom the effects of flux incident on the corresponding predetermined area element due to scattering caused by the presence of scattering volumes located externally to the object, thereby to generate a signal representative of the flux incident on that area element emanating only from the portion of the object corresponding to that area element.

2. The apparatus of claim 1 wherein the correcting means comprises:
   means for summing a signal representative of the flux incident on a predetermined area element with
   at least one signal representative of the flux emanating from at least one predetermined portion of the object other than the portion of the object corresponding to the predetermined area element.

3. The apparatus of claim 1 wherein the correcting means includes
   means for summing a weighted signal representative of the flux incident on a predetermined area element with
   at least one weighted signal representative of the flux emanating from at least one predetermined portion of the object other than the portion of the object corresponding to the predetermined area element.

4. The apparatus of claim 1 wherein the correcting means comprises:
   means for summing a signal representative of the flux incident on a predetermined area element with
   signals representative of the flux emanating from a predetermined number of portions of the object other than the portion of the object corresponding to the predetermined area element.

5. The apparatus of claim 1 wherein the correcting means comprises:
   means for summing a weighted signal representative of the flux incident on a predetermined area element with
   weighted signals representative of the flux emanating from a predetermined number of portions of the object other than the portion of the object corresponding to the predetermined area element.

6. The apparatus of claim 1 wherein the correcting means comprises
   an array of summing elements, each summing element corresponding to one of the area elements of the target plane, and
   an array of weighting elements connected to each summing element, each weighting element being associated with one of the total flux signal generating means, each weighting element being operative to weight the total incident flux signal generated by the total flux signal generating means with which it is associated in accordance with a predetermined weighting factor $W(x,y)$,
   each summing element being operative to sum the weighted signal representative of the total flux incident on the area element to which it corresponds with the weighted signal from each of the other weighting elements.

7. Apparatus for imaging an object having a predetermined number of discrete portions thereon, the object having flux emanating therefrom, the apparatus comprising:
   a target plane having a plurality of area elements, each area element corresponding to a portion of the object;
   means for generating a signal representative of the total incident flux on each predetermined area element; and
   means for correcting each total incident flux signal to eliminate therefrom the effects of flux incident on the corresponding predetermined area element due to scattering, thereby to generate a signal representative of the flux incident on that area element emanating only from the portion of the object corresponding to that area element;
   the correcting means comprising:
   an array of summing elements, each summing element corresponding to one of the area elements of the target plane, and
   an array of weighting elements connected to each summing element, each weighting element being associated with the total flux signal generating means, each weighting element being operative to weight the total incident flux signal generated by the total flux signal generating means in accordance with a predetermined weighting factor $W(x,y)$,
   each summing element being operative to sum the weighted signal representative of the total flux incident on the area element to which it corresponds with the weighted signal from a predetermined number of the other weighting elements;

the total incident flux signal generating means being responsive to a single test flux source disposed at a predetermined position with respect to the target plane to produce a response signal, a response coefficient $R(x,y)$ being defined by the ratio $\alpha/\beta$, where $\alpha$ is the response signal from the flux signal generating means to a predetermined single test flux source and $\beta$ is a quantity representative of the true flux emanating from the single test flux source, the response coefficients $R(x,y)$ defining a response coefficient matrix R, each weighting factor $W(x,y)$ being functionally related to the response coefficient matrix R.

8. The apparatus of claim 7 wherein each weighting factor $W(x,y)$ is directly proportional to its corresponding response coefficient $R(x,y)$.

9. The apparatus of claim 7 further comprising:

storing means connected to the output of each of the summing elements for storing the signal therefrom;

a set of feedback weighting elements, each feedback weighting element being associated with one of the storing means, each feedback weighting element being operative to weight a signal stored by the storing means with which it is associated by a predetermined feedback weighting factor $Z(x)$; and a switch operative to disconnect selected ones of the weighting elements from the total flux signal generating means with which they are associated and to connect each of those weighting elements to a predetermined one of the feedback weighting elements.

10. The apparatus of claim 7 wherein the weighting factors $W(x,y)$ define a weighting factor matrix having a main diagonal therethrough, the values of the weighting factors along the main diagonal of the weighting factor matrix being at least substantially equal to a first value.

11. The apparatus of claim 7 wherein the weighting factors $W(x,y)$ define a weighting factor matrix having a main diagonal therethrough, the values of the weighting factors along the main diagonal of the weighting factor matrix being equal to a first value.

12. The apparatus of claim 10 wherein the values of the weighting factors along a given one of any of the other diagonals of the matrix parallel to the main diagonal are at least substantially equal to the same value.

13. The apparatus of claim 11 wherein the values of the weighting factors along a given one of any of the other diagonals of the matrix parallel to the main diagonal are equal to the same value.

14. The apparatus of claim 7 wherein the weighting factors $W(x,y)$ define a weighting factor matrix having N columns and N rows therein and a main diagonal therethrough, the value of a given element on the main diagonal of the weighting factor matrix being at least substantially equal to a first value, and, in addition, the values of the all the other elements in the column of the weighting factor matrix containing that element are at least substantially equal to a second value.

15. The apparatus of claim 7 wherein the weighting factors $W(x,y)$ define a weighting factor matrix having N columns and N rows therein and a main diagonal therethrough, the value of a given element on the main diagonal of the weighting factor matrix being equal to a first value, and, in addition, the values of all the other elements in the column of the weighting factor matrix containing that element are equal to a second value.

16. The apparatus of claim 7 wherein the weighting factors $W(x,y)$ define a weighting factor matrix having a main diagonal therethrough, the values of the weighting factors along the main diagonal of the weighting factor matrix being at least substantially equal to a first value, and, in addition, the values of all of the other elements of the weighting factor matrix are at least substantially equal to a second value.

17. The apparatus of claim 7 wherein the weighting factors $W(x,y)$ define a weighting factor matrix having a main diagonal therethrough, the values of the weighting factors along the main diagonal of the weighting factor matrix being equal to a first value, and, in addition, the values of all of the other elements of the weighting factor matrix are equal to a second value.

18. The apparatus of claim 7 wherein the weighting factors $W(x,y)$ define a weighting factor matrix W, the weighting factor matrix W being the inverse of the response coefficient matrix R.

19. The apparatus of claim 7 wherein the weighting factors $W(x,y)$ define a weighting factor matrix W, the weighting factor matrix W being the pseudo-inverse of the response coefficient matrix R.

20. Apparatus for imaging an object having a predetermined number of discrete portions thereon, the object having flux emanating therefrom, the apparatus comprising:

a target plane having a single physical area element thereon, the single physical area element being associated with each portion of the object in temporal succession, thereby generating a succession of area elements corresponding to each portion of the object;

means for generating a signal representative of the total incident flux on each successive predetermined area element each total flux signal being weighted, the weighting being determined by the responses of the incident flux signal generating means to a single test flux source positioned at a predetermined position with respect to the target plane; and means for correcting each total incident flux signal to eliminate therefrom the effects of flux incident on the corresponding predetermined successive area element due to scattering caused by the presence of scattering volumes located externally to the object, thereby to generate a signal representative of the flux incident on that successive area element emanating only from the portion of the object corresponding thereto.

21. A densitometer apparatus for imaging a transparency having a predetermined number of discrete pixels thereon, the densitometer comprising:

a support member for supporting a transparency;

a source of radiation for illuminating the transparency to cause radiant flux to emanate from the transparency;

an array of 1, ..., i, ... N photodetectors, each photodetector i corresponding to a predetermined pixel, each photodetector being operative to generate a signal representative of the total flux $I_M$ (i) incident thereon, each total flux signal being weighted, the weighting being determined by the response of each photodetector to a single test flux source positioned at a predetermined position with respect to the photodetectors; and means for correcting the signal representative of the total flux incident on each photodetector to eliminate therefrom the effects of flux incident on that photodetector due to scattering caused by the presence of scattering volumes located externally to the transparency, thereby to generate a signal representative of the transmittance of the pixel of the transparency corresponding to that predetermined photodetector.

22. The densitometer of claim 21 wherein the correcting means comprises:
means for summing a signal representative of the flux incident on a predetermined photodetector with
at least one signal representative of the flux emanating from at least one predetermined pixel of the transparency other than the pixel of the transparency corresponding to the predetermined photodetector.

23. The densitometer of claim 21 wherein the correcting means comprises:
means for summing a weighted signal representative of the flux incident on a predetermined photodetector with
at least one weighted signal representative of the flux emanating from at least one predetermined pixel of the transparency other than the pixel of the transparency corresponding to the predetermined photodetector.

24. The densitometer of claim 21 wherein the correcting means comprises:
means for summing a signal representative of the flux incident on a predetermined photodetector with
signals representative of the flux emanating from a predetermined number of pixels of the transparency other than the pixel of the transparency corresponding to the predetermined photodetector.

25. The densitometer of claim 21 wherein the correcting means comprises:
means for summing a weighted signal representative of the flux incident on a predetermined photodetector with
weighted signals representative of the flux emanating from a predetermined number of pixels of the transparency other than the pixel of the transparency corresponding to the predetermined photodetector.

26. The densitometer of claim 21 wherein the correcting means comprises:
an array of summing elements, each summing element corresponding to a predetermined one of the photodetectors, and
an array of weighting elements connected to each summing element, each weighting element being associated with one of the photodetectors, each weighting element being operative to weight the signal generated by the photodetector with which it is associated in accordance with a predetermined weighting factor $W(x,y)$,
each summing element being operative to sum the weighted signal representative of the total flux incident on the photodetector which it corresponds with the weighted signal from each of the other weighting elements.

27. A densitometer apparatus for imaging a transparency having a predetermined number of discrete pixels thereon, the densitometer comprising:
a support member for supporting a transparency;
a source of radiation for illuminating the transparency to cause radiant flux to emanate from the transparency;
an array of 1, ..., i, ... N photodetectors, each photodetector i corresponding to a predetermined pixel, each photodetector being operative to generate a signal representative of the total flux $I_M(i)$ incident thereon; and
means for correcting the signal representative of the total flux incident on each photodetector to eliminate therefrom the effects of flux incident on that photodetector due to scattering, thereby to generate a signal representative of the transmittance of the pixel of the transparency corresponding to that predetermined photodetector;
the correcting means comprising:
an array of summing elements, each summing element corresponding to a predetermined one of the photodetectors, and
an array of weighting elements connected to each summing element, each weighting element being associated with one of the photodetectors, each weighting element being operative to weight the signal generated by the photodetector with which it is associated in accordance with a predetermined weighting factor $W(x,y)$,
each summing element being operative to sum the weighted signal representative of the total flux incident on the photodetector which it corresponds with the weighted signal from a predetermined number of the other weighting elements;
wherein each of the photodetectors is responsive to a single test pixel disposed on a test transparency at a predetermined position on the support member to produce a response signal for that photodetector,
a response coefficient $R(x,y)$ being defined by the ratio $\alpha/\beta$,
where $\alpha$ is the response signal from a predetermined one of the photodetectors to a predetermined single test pixel and
$\beta$ is a quantity representative of the true flux emanating from the single test pixel,
the response coefficients $R(x,y)$ defining a response coefficient matrix R,
each weighting factor $W(x,y)$ being functionally related to the response coefficient matrix R.

28. The densitometer of claim 27 wherein each weighting factor $W(x,y)$ is directly proportional to its corresponding response coefficient $R(x,y)$.

29. The densitometer of claim 28 wherein there are N photodetectors, and wherein the transmittance of the i-th pixel of the transparency being expressed as $$T(i) = [1/R(i,i)] \left[ I_M(i) - \sum_{\substack{j=1 \\ j \neq i}}^{N} R(i,j) I_M(j) / R(j,j) \right],$$

$i = 1, \ldots, N.$

30. The densitometer of claim 29 wherein each $I_M(j)$ is replaced by a value that is proportional to the result $T(j)$ of a previous application of the expression for $T(i)$ and wherein the value of $I_M(i)$ remains unchanged.

31. The densitometer of claim 27 wherein the weighting factors $W(x,y)$ define a weighting factor matrix having a main diagonal therethrough, the values of the weighting factors along the main diagonal of the weighting factor matrix being at least substantially equal to a first value.

32. The densitometer of claim 27 wherein the weighting factors W(x,y) define a weighting factor matrix having a main diagonal therethrough, the values of the weighting factors along the main diagonal of the weighting factor matrix being equal to a first value.

33. The densitometer of claim 32 wherein the values of the weighting factors along a given one of any of the other diagonals of the matrix parallel to the main diagonal are at least substantially equal to the same value.

34. The densitometer of claim 32 wherein the values of the weighting factors along a given one of any of the other diagonals of the matrix parallel to the main diagonal are equal to the same value.

35. The densitometer of claim 27 wherein the weighting factors W(x,y) define a weighting factor matrix W having N columns and N rows therein and a main diagonal therethrough, the value of a given element on the main diagonal of the weighting factor matrix being at least substantially equal to a first value, and, in addition, the values of all the other elements in the column of the weighting factor matrix containing that element are at least substantially equal to a second value.

36. The densitometer of claim 27 wherein the weighting factors W(x,y) define a weighting factor matrix W having N columns and N rows therein and a main diagonal therethrough, the value of a given element on the main diagonal of the weighting factor matrix being equal to a first value, and, in addition, the values of all the other elements in the column of the weighting factor matrix containing that element are equal to a second value.

37. The densitometer of claim 27 wherein there are N photodetectors, and wherein $R(p) = R(q, r)$, where $p = q - r$, the transmittance of the i-th pixel of the transparency being expressed as $$T(i) = [1/R(O)] \left[ I_M(i) - \sum_{\substack{j=1 \\ j \neq i}}^{N} R(i-j) I_M(j)/R(O) \right],$$

$i = 1, \ldots, N.$

38. The densitometer of claim 27 wherein the weighting factors W(x,y) define a weighting factor matrix having a main diagonal therethrough, the values of the weighting factors along the main diagonal of the weighting factor matrix being at least substantially equal to a first value, and, in addition, the values of all of the other elements of the weighting factor matrix are at least substantially equal to a second value.

39. The densitometer of claim 27 wherein there are N photodetectors, and wherein $$R'(O) = [1/N] \sum_{j=1}^{N} R(j, j)$$

and $$R'(j) = [1/(N-1)] \sum_{\substack{i=1 \\ j \neq i}}^{N} R(i, j),$$

$j = 1, \ldots, N,$ and wherein the transmittance of the i-th pixel of the transparency being expressed as $$T(i) = I_M(i)/R'(O) - [1/R'(O)] \left[ \sum_{\substack{j=1 \\ j \neq i}}^{N} R'(j) I_M(j)/R'(O) \right],$$

$i = 1, \ldots, N.$

40. The densitometer of claim 27 wherein the weighting factors W(x,y) define a weighting factor matrix W having a main diagonal therethrough, the values of the weighting factors along the main diagonal of the weighting factor matrix being equal to a first value, and, in addition, the values of all of the other elements of the weighting factor matrix are equal to a second value.

41. The densitometer of claim 27 wherein there are N photodetectors, wherein $$R'(O) = [1/N] \sum_{j=1}^{N} R(j, j)$$

and $$R'(j) = [1/(N-1)] \sum_{\substack{i=1 \\ j \neq i}}^{N} R(i, j),$$

$j = 1, \ldots, N,$ wherein $$a = [1/R'(O)]^2 [1/N] \sum_{j=1}^{N} R'(j),$$

and wherein $$T(i) = I_M(i)/R'(O) - a \sum_{j=1}^{N} I_M(j).$$

$i = 1, \ldots, N.$

42. The densitometer of claim 27 wherein the weighting factors W(x,y) define a weighting factor matrix W, the weighting factor matrix W being the inverse of the response coefficient matrix R.

43. The densitometer of claim 27 wherein the weighting factors W(x,y) define a weighting factor matrix W, the weighting factor matrix W being the pseudo-inverse of the response coefficient matrix R.

44. A method for imaging an object having a predetermined number of discrete portions thereon, the object having flux emanating therefrom, the method comprising the steps of:

(a) generating a signal representative of the total incident flux on each area element of a target plane, each area element corresponding to a portion of the object, each total flux signal being weighted, the weighting being determined by the response of each incident flux signal generating means to a single test flux source positioned at a predetermined position with respect to the target plane; and (b) correcting each total incident flux signal to eliminate therefrom the effects of flux incident on the corresponding predetermined area element due to scattering caused by the presence of scattering volumes located externally to the object, thereby to generate a signal representative of the flux incident on that area element emanating only from the portion of the object corresponding to that area element.

45. The method of claim 44 wherein the correcting step (b) comprises the step of:
(b1) summing a weighted signal representative of the flux incident on a predetermined area element with at least one weighted signal representative of the flux emanating from a predetermined number of portions of the object other than the portion of the object corresponding to the predetermined area element.

46. The method of claim 44 wherein the correcting step (b) comprises the step of:
(b1) weighting each total incident flux signal with a predetermined weighting factor $W(x,y)$; and
(b2) summing the weighted signal representative of the total flux incident on the area element to which it corresponds with weighted signals from each of the other weighting elements.

47. A method for imaging an object having a predetermined number of discrete portions thereon, the object having flux emanating therefrom, the method comprising the steps of:
(a) using a single test flux source, exciting each one of a plurality of a signal generators each one of which is associated with a corresponding area element of a target plane to generate a signal representative of the total incident flux on the corresponding area element of a target plane,
(b) producing a response coefficient matrix formed of response coefficients $R(x,y)$, where each response coefficient is defined by a ratio $\alpha/\beta$, where $\alpha$ is the signal generated from a predetermined one of the flux signal generators to a predetermined single test flux source and
$\beta$ is a quantity representative of the true flux emanating from the single test flux source,
(c) using the response coefficients $R(x,y)$, generating a weighting factor matrix formed of weighting factors $W(x,y)$,
(d) generating from each of the plurality of signal generators a signal representative of the total flux emanating from an unknown object and incident on each area element of the target plane, each area element being defined to correspond to a portion of an unknown object;
(e) weighting each total incident flux signal with a predetermined weighting factor $W(x,y)$; and
(f) summing the weighted signal representative of the total flux incident on the area element to which it corresponds with the weighted signal from other weighting elements, thereby to generate a signal representative of the flux incident on that area element emanating only from the portion of the object corresponding to that area element.

48. A method for imaging an object having a predetermined number of discrete portions thereon, the object having flux emanating therefrom, the method comprising the steps of:
(a) generating a temporal succession of signals representative of the total incident flux on an area element of a target plane, each successive total incident flux signal corresponding to a portion of the object, each total flux signal being weighted, the weighting being determined by the responses of the incident flux signal generating means to a single test flux source positioned at a predetermined position with respect to the target plane; and
(b) correcting each total incident flux signal to eliminate therefrom the effects of flux incident on the area element due to scattering caused by the presence of scattering volumes located externally to the object.

* * * * *